July 11, 1944.  C. M. JOHNSON  2,353,309
COMBINED OCULAR AND MATHEMATICAL COMPUTATION DEVICE
Filed Oct. 27, 1943    2 Sheets-Sheet 1
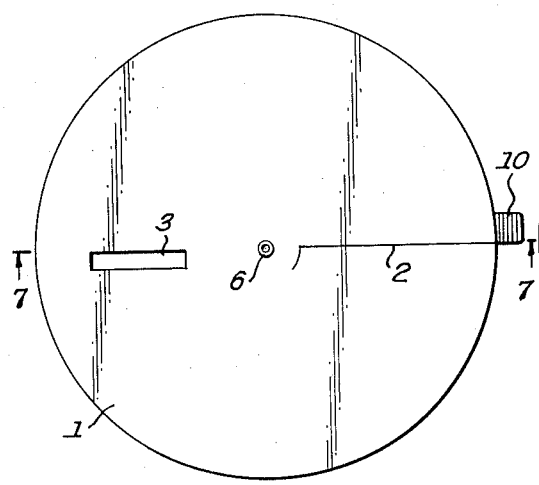
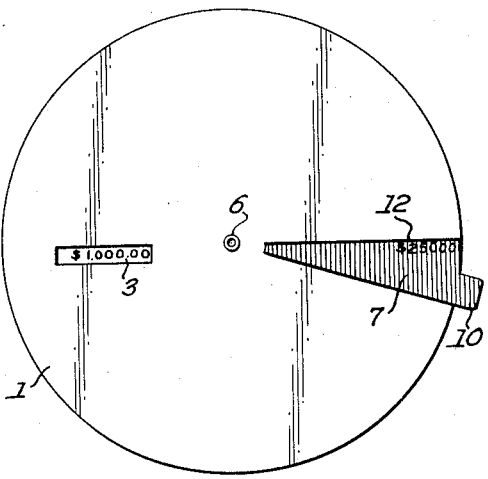
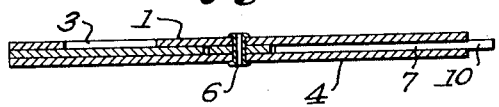
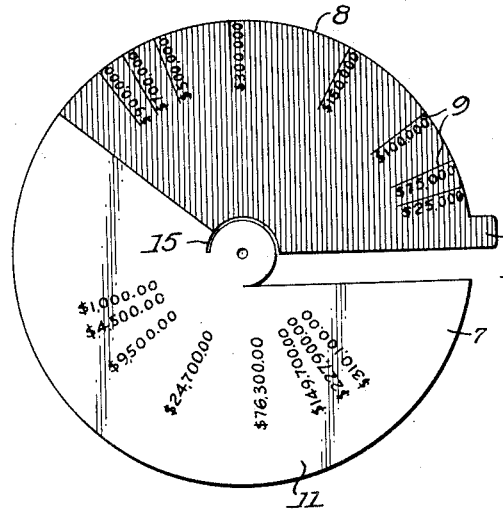
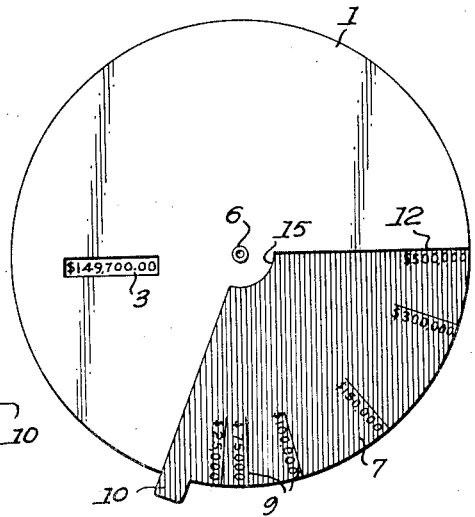
Inventor:
CLARENCE M. JOHNSON
By Alan M. Johnson
Attorney.

July 11, 1944.  C. M. JOHNSON  2,353,309
COMBINED OCULAR AND MATHEMATICAL COMPUTATION DEVICE
Filed Oct. 27, 1943  2 Sheets-Sheet 2

Inventor:
CLARENCE M. JOHNSON
By Alantha Johnson
Attorney.

Patented July 11, 1944

2,353,309

UNITED STATES PATENT OFFICE 2,353,309

COMBINED OCULAR AND MATHEMATICAL COMPUTATION DEVICE

Clarence M. Johnson, Dunellen, N. J., assignor of one-half to Marjorie E. Davis, Plainfield, N. J.

Application October 27, 1943, Serial No. 507,823

5 Claims. (Cl. 235—88)

My invention comprises a single computation device, having a fixed and a movable member by which the eye of the user can instantly apprise, on the fixed member, the relative portion of the whole of any numerical sum, or quantity of material, which will be left, or remain after certain reductions are made for commissions, or taxes, or fees, or interest, or any charge which can be lawfully taken from the said sum or quantity of material.

My computation device also, at the same time, and by the same adjustment of the movable member will show on that member the exact mathematical deduction in money, or weight, or measure which will be deducted from the total sum of money, or goods, under discussion, represented by the fixed member.

For purposes of illustration and description, I will describe my invention in connection with the gross estate of a decedent, and give an ocular and mathematical computation of such gross estate before and after it has been reduced by the applicable death and inheritance taxes levied on such an estate by the United States Government, the taxes levied by the State of which he is a resident, executor's fees and other costs. These different deductions can each be shown on a plurality of my computation devices.

Preferably, I add all these reductions, charges and costs together, so that only one of my computation devices need be used. In this way, the net estate is shown ocularly at once, and also the exact sum of all charges which will be lawfully deducted from the gross estate.

For purposes of illustration, I have shown my invention in connection with one or more fixed circular discs, but other geometrical forms may be employed.

In the drawings:

Fig. 1 is a plan view of one form of my invention, comprising two (2) circular connected fixed discs, with an intermediate movable member, the tab of which only shows in this figure.

Fig. 2 is a plan view, the same as Fig. 1, except the moving member has been rotated through the slit in the upper or face disc, to show the figure $25,000.00 gross estate, covering or obliterating only a small portion of the face disc which represents the gross estate, and also exhibiting in the window the sum of $1000.00, which is the mathematical computation of deductions and costs on such an estate.

Fig. 3 is a plan view, the same as Figures 1 and 2, except the moving member has been further rotated to show the sum of $500,000.00. This movement further obliterates or covers a larger portion of the surface of the face plate, which, in this case, represents a gross estate of $500,000.00. In the window the sum of $149,700.00 is shown, which is the mathematical compilation of costs on such an estate.

Fig. 4 is a plan view showing the movable member rocked or moved to the sum of $900,000.00 to show how much more of the face plate representing the gross estate is covered or obliterated by the moving member. In this position of the part, the figure $310,100.00 appears in the window of the face plate, which is the mathematical computation, of the amount of taxes and costs which will be deducted from such a large gross estate. The figures referred to are simply given by way of example. The moving member is preferably colored to aid the ocular computation. The portion of the face plate not covered by the moving member, in each instance, ocularly shows the net estate.

Fig. 5 is a plan view of the movable member with its guide scale, preferable on the contrasting segment of the movable member, the mathematical computation of the deductible costs are preferably located on the uncolored portion of the disc, which appears under the window.

Fig. 7 is a cross-section on line 7—7 of Fig. 1 looking in the direction of the arrows, the thicknesses of the preferred form of the discs being exaggerated for the purpose of illustration.

Figure 4:
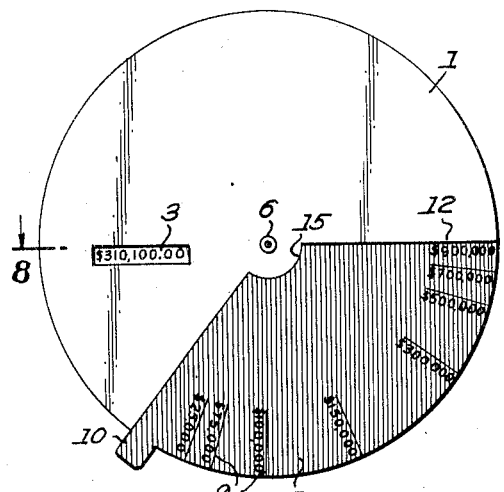

The figures and sums referred to are simply for example. They may be varied to fit any particular ocular and mathematical computation found desirable.

In the preferred form of my invention, shown in Figs. 1-8 of the drawings, I employ a circular face plate 1 of cardboard, provided with a radial slit 2, and a window 3. The rear plate 4, is also a circular cardboard, to which the lip 5 of the slit 2 is secured in any suitable manner, as by pasting. Between the face plate 1 and the rear plate 4 is mounted on a pivot, as for example, an eyelet 6, which also assists in holding the two plates or discs 1 and 4 together, a movable member which, in this form of my invention is a semi-rotatable member 7, pivoted on the eyelet 6, or any other suitable pivot. Of course, this eyelet may be any form of fastening member, to assist in holding the two discs 1 and 4 together, and still permit free movement within its arc of the movable member 7.

This movable or rocking member 7 has a portion colored to contrast with that of the face plate 1, to accentuate how much of the gross estate, or valuables, or goods, or commodities, as the case may be, are wiped out by taxes, or commissions, or interests, or costs, or other lawful deductions.

On the portion 8 of this movable member 7, is a setting scale 9, which in the form of the invention illustrated, by way of example, is a series of figures, representing different gross estates. By grasping the tab 10 of the movable member 7, and pulling on it, the member 7 is caused to rock and ride up the depressed and glued lip 5, Fig. 6, of the slit 2, which in effect acts as a mutilated screw thread, and forces the guide scale portion 8 of the rocking member 7 to overlap and obliterate, more or less, a portion of the face plate or disc 1, depending on how far it is moved or rocked. The movable member 7 is preferably provided with an arcuate slit or slot 15, to permit it to be readily flexed. The amount of movement of the movable member 7 is dependent on the amount of the gross estate under computation. On the rocking member 7 opposite the setting scale 9, is another scale 11, having the mathematical computation of the applicable Federal and State inheritance taxes, executors fees, and other costs corresponding to the gross estate shown by the setting scale 9. The different sums of scale 11 are brought severally under the window 3 in the face disc or plate 1, to correspond with the gross estate indicated on the setting scale 9.

It will, therefore, be seen that given the gross estate and rotating the movable member 7, so that the sum on the setting scale 9 is brought adjacent to the line 12, forming one surface of the slit 2, you first obtain an optical and lasting impression of what is left or exposed of the surface of the face disc or plate 1, representing the net estate, and then, by looking through the window 3 you see the mathematical computation of the deductions for that particular estate.

Figure 9:
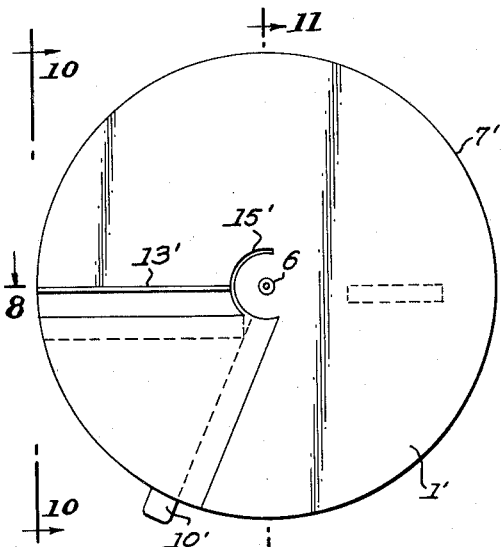
Fig. 9 is a bottom plan view of a modification in which the rear fixed non-rotatable disc is omitted, and illustrating the front disc provided with a guide, up which a portion of the rotatable member, shown in dotted lines in such figure, is guided to the upper surface of the front disc.
Figure 8:
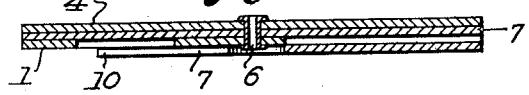
Fig. 8 is a cross-section on line 8—8 of Fig. 4 looking in the direction of the arrows the thicknesses of the preferred form of the discs being exaggerated for the purpose of illustration.
Figure 10:
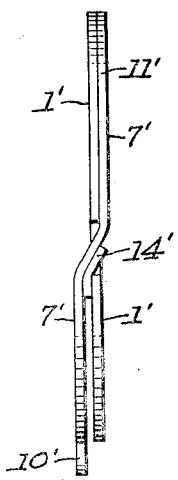
Fig. 10 is an end elevation of Fig. 9 looking in the direction of the arrows shown in connection with the dotted line 10—10.
Figure 6:
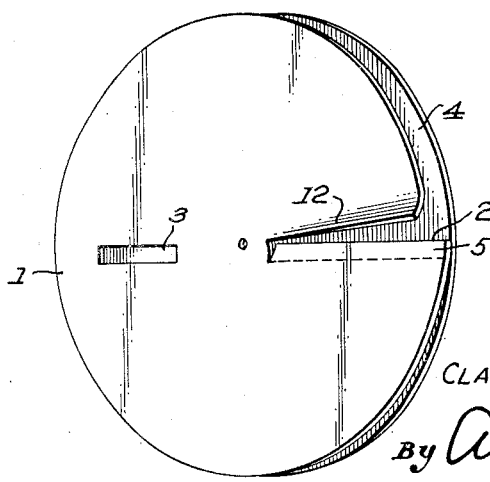
Fig. 6 is a distorted view of the preferred form of my invention, showing a lip of the front disc bent down and fastened to the rear disc, by gluing, or some other manner, to hold them together, and form an inclined surface up which a portion of the movable disc rides to overlay a portion of the front fixed disc.
Figure 11:
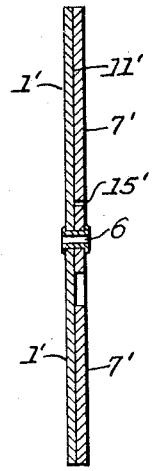
Fig. 11 is a cross section on line 11—11 of Fig. 9.

I have illustrated a modification of my invention in Figs. 9 and 10, in which I employ only one fixed plate or disc, as the plate or disc 1', and the movable member 7'. In this modification I fasten a guide strip of cardboard, or other suitable material 13', to the back of disc 1', forming an inclined guide 14', Fig. 10, up which the guide scale portion 9' of the movable rocking member 7' moves to allow said guide scale to cover, more or less, the surface of the fixed plate or disc 1', to ocularly compute what the net estate will be after payment of the lawful deductions. This movement will also, as in the preferred form, bring the proper figures of the mathematical computation of scale 11 under the window 3.

I am aware that computing devices have been used formed of discs, or series of discs, and one or more windows, in one or more discs. But I believe myself to be the first inventor of a combined ocular and mathematical computation device, in which the eye, without the aid of figures, grasps at once the portion of the gross estate which is absorbed by taxes and other charges, and the portion which is net, and in addition gives the exact mathematical computation in figures of all charges or deductions, or any portion of such charges as may be desired.

My invention is particularly useful to bankers, trust companies, public accountants, lawyers, bookkeepers and others.

For example, a banker instead of computing for each client how much his estate will net his legatees, first figuring out the Federal taxes, then the State taxes, executor's fees, and other charges, he can by simple manipulation, within a few seconds, give this information to his client, and what is of equal importance, he can impress ocularly on the client what these figures mean, by showing him how much of the face plate or disc 1 is over-laid or obliterated by the rocking member 7, which should preferably be of a contrasting color, to assist this ocular impression.

While I describe my invention as being made of cardboard, it is of course understood it may be made of sheet metal, plastic, or any other suitable material.

Having thus described this invention in connection with illustrative embodiments thereof, to the details of which I do not desire to be limited, what is claimed as new and what is desired to secure by Letters Patent is set forth in the appended claims.

What I claim is:

1. A combined ocular and mathematical computation device, including a fixed member formed as a geometrical figure, representing a unit, and provided with a window, a movable member provided with a guide scale and with mathematical computations to be exposed under the window, said movable member adapted to move more or less across the face of the fixed member, corresponding to the mathematical computation exposed under the window to give at one and the same time both an ocular and mathematical computation.

2. A combined ocular and mathematical computation device, including a fixed circular plate or disc, representing a unit and provided with a window, a movable member provided with a guide scale and with mathematical computation to be exposed under the window, said movable member adapted to move, more or less, across the face of the fixed circular plate or disc corresponding to the mathematical computation exposed under the window, to give at one and the same time, both an ocular and a mathematical computation.

3. A combined ocular and mathematical computation device, including two (2) fixed discs or plates connected together, the front or face disc or plate representing a unit, and provided with a window, a movable member mounted between the two discs, provided with a guide scale and with mathematical computations, means to permit a portion of said movable member, to over-lay or be superimposed on a portion of the face plate or disc, to reduce its exposed area, more or less, corresponding with the mathematical computations under the window, to give at one and the same time both an ocular and a mathematical computation of the amount that the unit is reduced by costs, taxes, interest, or other charges.

4. A combined ocular and mathematical computation device, including two (2) plates or discs, the face of the front plate or disc representing a unit, and provided with a window, and a radial slit, one edge of which is bent down and secured to the rear disc, forming an inclined surface and holding the two discs together, a pivoted member mounted between the two discs, a portion of which is adapted to move up the inclined surfaces connecting the two discs and overlaying, more or less, a portion of the face disc, the pivoted member being provided with a guide scale, and with mathematical computation, adapted to be brought under the window, as the pivoted member overlays or obliterates, more or less, the area of the face disc corresponding to its position set by the guide scale, thereby giving at one and the same time an ocular and mathematical computation.

5. A new article of manufacture, comprising a combined ocular and mathematical computation device, having a circular face plate to designate a unit, and provided with a radial slit and a window, a pivoted member, an axial pivot on which the pivoted member is pivoted behind the face disc, a portion of said member being adapted to pass through the radial slit and overlay a portion of said face plate, said pivoted member being provided with a guide scale and with mathematical computation to be brought under the window, the movement of the pivoted member across the face plate, temporarily covering or obliterating a portion of said face plate, corresponding to the figures on the guide scale, and ocularly illustrating how much of the unit represented by the face disc would be lost, or depreciated, or reduced by taxes, or interest, or fees, or legal charges, and at the same time, displaying the correct mathematical computation beneath the window in the face disc.

CLARENCE M. JOHNSON.